United States Patent [19]

Fischer et al.

[11] Patent Number: 5,069,725
[45] Date of Patent: Dec. 3, 1991

[54] METHOD AND APPARATUS FOR CLEANING LAYERS OF EARTH

[75] Inventors: Joachim Fischer, Dormagen; Andreas Müonning, Düsseldorf, both of Fed. Rep. of Germany

[73] Assignee: Philipp Holzmann Aktiengesellschaft, Frankfurt am Main, Fed. Rep. of Germany

[21] Appl. No.: 332,260

[22] Filed: Mar. 31, 1989

[30] Foreign Application Priority Data

Mar. 31, 1988 [DE] Fed. Rep. of Germany ....... 3810941
Dec. 24, 1988 [DE] Fed. Rep. of Germany ....... 3843836

[51] Int. Cl.$^5$ ............................................. B08B 3/02
[52] U.S. Cl. ................................................... 134/42
[58] Field of Search .......................................... 134/42

[56] References Cited

U.S. PATENT DOCUMENTS

3,432,348 3/1969 Jones, Jr. ............................ 134/42
4,447,541 5/1984 Peterson ............................. 134/42

Primary Examiner—Asok Pal
Attorney, Agent, or Firm—Robert W. Becker & Associates

[57] ABSTRACT

A method and apparatus for cleaning layers of earth that contain noxious material via a cleaning medium that takes up the noxious material and is introduced into the layers of earth via a drilling tube. The cleaning medium is extracted by suction from the layers of earth and is subsequently processed. To achieve a precise cleaning on the spot in a continuous manner without the necessity for excavating the earth, the cleaning is effected within a chamber that surrounds the drilling tube. The chamber can be lowered into the ground either together with or separately from the drilling tube. After termination of the cleaning process, at least parts of chambers used therefor are removed from the ground and shifted to a region that has not yet been cleaned, resulting in an advancement of the cleaning process in a horizontal direction. A sludge mixture can also be pumped from the chamber into a cleaning unit, with the clean, recovered earth again being introduced into the chamber.

8 Claims, 8 Drawing Sheets

METHOD AND APPARATUS FOR CLEANING LAYERS OF EARTH

BACKGROUND OF THE INVENTION

The present invention relates to a method of cleaning layers of earth that contain noxious material, including separating the noxious material on the spot from loosened earth particles with a cleaning medium that is introduced into the earth layers under high pressure, and further including removing the noxious material with the cleaning medium, which is returned at the surface of the ground.

The present invention also relates to an apparatus for cleaning layers of earth that contain noxious material via a cleaning medium that takes up the noxious material and is introduced into the layers of earth via a drilling tube, with the cleaning medium, possibly together with earth particles, being extracted by suction from the layers of earth and subsequently being processed, and with the drilling tube being provided at its bottom end with a drill bit, and slightly thereabove, with an outlet nozzle for the cleaning medium, which is under high pressure.

In many cases, the removal of noxious materials from layers of earth is impeded by the changing stratification of different earth layers having various mechanical and physical properties. In many cases, earth that is loaded with noxious material must therefore be excavated and cleaned beyond the actual excavation site. However, if in addition to changing ground structure, little space is available and the depths of the uncleaned ground are great, the costs for excavating the earth become disproportionately high due to extensive safety measures that have to be undertaken. In such cases, it is desirable to be able to clean the earth on the spot. For this purpose, among others, biological earth-cleaning processes are known; however, these processes can be used to only a limited extent, especially where the layers of earth change. In addition, the time required for biological cleaning processes extends over several vegetation seasons.

One known method for cleaning layers of earth that contain noxious material uses a drilling tube that comprises an inner tube, which guides the cleaning medium into the layers of earth, as well as an outer tube that surrounds the inner tube. The bottom end of the inner tube is provided with a drill bit above which is disposed an outlet nozzle for the cleaning medium, which is under high pressure. Above the outlet nozzle, the outer tube is sealed off relative to the inner tube and is provided near its bottom end with a suction opening for the cleaning medium that is loaded with noxious material. Via an annular space that is formed between the outer and inner tubes, the cleaning medium that is loaded with noxious material returns under the effect of a suction pump to the surface of the earth, where it is conveyed to a processing unit. The earth-cleaning process that can be carried out with the heretofore known apparatus is carried out either during lowering or during retraction of the rotating drilling tube. The cleaning medium that is supplied via the inner tube leaves the outlet nozzle under high pressure and horizontally enters the earth layer that is to be cleaned as a cutting stream or jet. In this manner, the particles of the ground are sprayed and washed, and noxious material is removed. Due to the advancing axial movement of the drilling tube, the layers of earth that are saturated with cleaning medium subsequently reach the effective range of the suction opening of the outer tube, from where they are conveyed to the surface of the earth for subsequent transfer to a processing unit.

A drawback of this heretofore known method is that the column of earth taken care of by the cleaning process can have a varying diameter, since depending upon the construction of the earth layer, the depth to which the cutting jet penetrates and the magnitude of the respectively cleaned area about the drilling tube vary. This can lead to an undesirable influence upon already-cleaned areas, or areas of the earth that are free of noxious material.

It is therefore an object of the present invention to provide a method and apparatus for cleaning layers of earth that contain noxious material, with this method and apparatus permitting a precise localization of the area of earth that is to be subjected to the respective cleaning process, and also assuring at any given time control over the progress of the boundary between areas of earth that have been cleaned and that still contain noxious material.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The method of the present invention is characterized primarily in that the cleaning process progresses in a vertical direction and is carried out in a tubular chamber that is introduced into the ground and that, for advancement of the cleaning, has its respective introduction into the ground shifted in a horizontal direction.

The method of the present invention has the advantage of making it possible to precisely localize the progress of the boundary between regions of the ground that are cleaned and that still contain noxious material, so that a precise determination of the portions of the ground that must still be subjected to a cleaning can be undertaken. In particular, use of the inventive method prevents cleaning medium that is loaded with noxious material from passing into adjacent regions that have already been cleaned or are free of noxious material.

Pursuant to a further embodiment of the inventive method, after termination of the respective cleaning process, at least portions of the chambers utilized therefor are removed from the ground and are shifted into a region of the ground that has not yet been cleaned. It is particularly advantageous to shift the chambers, or portions thereof, in such a way that the chambers form a horizontally advancing honeycombed pattern. By utilizing this "migrating" or shifting method of operation, larger surfaces can also be subjected to a systematic cleaning, with the progress of the boundary between regions of the ground that have been cleaned and that still contain noxious material being capable of being clearly determined at any time.

The apparatus of the present invention is characterized by a downwardly open chamber that extends about the drilling tube and extends into the layers of earth at least to the depth of the drill bit.

Pursuant to further specific embodiments of the inventive apparatus, the chamber can be formed by a cylindrical tube or can be composed of several vertically extending forms, with the chamber in particular having the shape of a polygon.

Pursuant to a further embodiment of the present invention, the connection of the forms to one another can be realized by coupling members that slide within one another, with this additionally improving the compartmentalization relative to the escape of cleaning medium that is loaded with noxious material.

Pursuant to further specific embodiments of the present invention, the drilling tube can be embodied in such a way that it can either be axially shiftable relative to the chamber, or does not shift axially relative thereto. If the drilling tube is shiftable relative to the chamber, it is advantageous to provide a radial guidance for the drilling tube in the region of the chamber, and in this way to assure centering of the drilling tube.

In another embodiment of the present invention, the upper side of the chamber is sealingly closed off and is provided with a connection to a pressure pump. In this manner, the flow of cleaning medium from the suction opening is enhanced with straightforward technical means.

It is also proposed pursuant to the present invention that the drilling tube be comprised of an inner tube, which is provided with the drill bit as well as the outlet nozzle, and also an outer tube that extends about the inner tube and that is sealed off relative thereto above the outlet nozzle. In the vicinity of its lower end, the outer tube is provided with at least one suction opening for the cleaning medium that is loaded with noxious material, while the upper end of the outer tube is provided with an outlet or discharge opening for the cleaning medium that contains noxious material and is to be conveyed to the surface of the earth in the annular space between the inner tube and the outer tube. Thus with a single drilling tube it is possible to effect not only the introduction of the cleaning medium into the layers of earth, but also the extraction of the cleaning medium on the spot.

Pursuant to another specific embodiment of the inventive apparatus, the suction connection of a suction pump is connected to the discharge opening of the outer tube. The suction pump is primarily used where the depth from which cleaning fluid that is loaded with noxious material is to be extracted is not too great.

In contrast, where the inventive apparatus is to be used at greater depths, it is advisable, pursuant to a further specific embodiment of the present invention to dispose in the drilling tube at least one compressed air line that opens above the suction opening in the annular space between the inner and outer tubes, and that conveys the cleaning medium that is loaded with noxious material upwardly to the surface of the earth in conformity with the principle of an air draft pump.

Pursuant to another specific embodiment, the suction opening is provided with a cylindrical screen that extends about the inner tube. This assures that only cleaning medium that is loaded with noxious material, but not particles of the earth, are extracted.

To prevent clogging of the screen, and hence a reduction of the suction effect, it is finally proposed to secure the screen either on the inner tube or on the outer tube, and to embody an edge of the respectively other tube in such a way that as a consequence of a relative movement between the tubes, the edge can be guided over the surface of the screen in a cleaning manner.

Depending upon the type of earth and the characteristic of the noxious material, it is possible that a sludge mixture cannot be separated within the chamber into earth components on the one hand and noxious material-cleaning medium mixture on the other hand. Therefore, pursuant to a further specific embodiment of the present invention, it is additionally proposed to dispose within the chamber a pump for solid matter; with this pump it is possible to reliably convey a sludge mixture composed of earth particles, noxious material, and cleaning medium, even from great depths.

Pursuant to a further specific embodiment, the conveying capacity of the pump for solid matter is controlled in such a way that the open ground water level within the chamber does not exceed a prescribed low-level mark, in order in this way to avoid a hydraulic foundation failure at the base of the chamber. Additional water can be filled into the chamber from above to control the ground water level therein.

With the use of such an embodiment, the sludge mixture is processed in a cleaning unit, and the cleaned ground particles are again placed into the chamber, whereby, depending upon requirements, the ground within the chamber can either be mechanically compacted, and/or can be optimized by the addition of binders and/or further materials.

Further specific features of the present invention will be described in detail subsequently.

DESCRIPTION OF PREFERRED EMBODIMENTS

Figure 1:
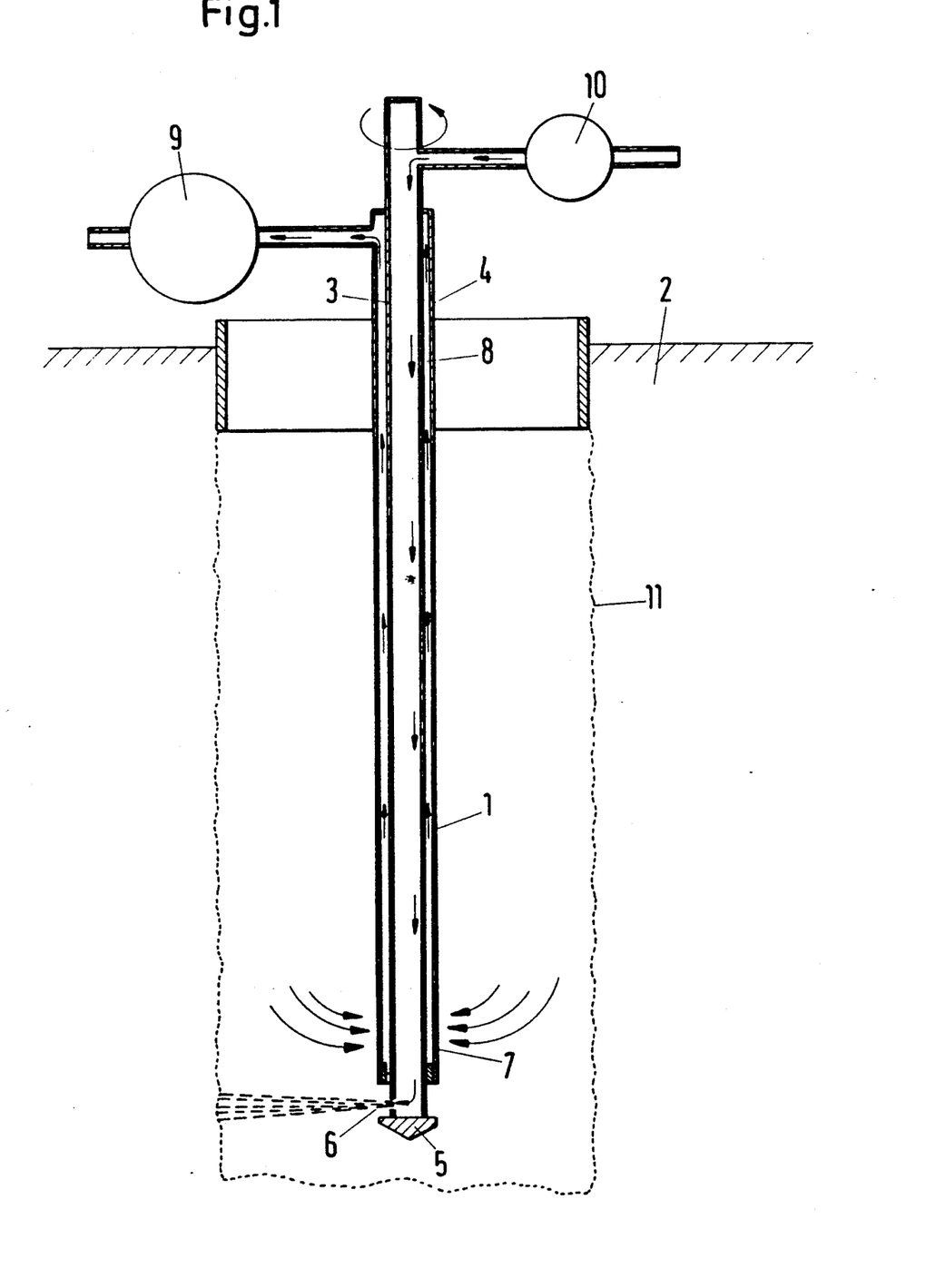
FIG. 1 shows an apparatus, with connections, that has been lowered into the ground for cleaning layers of earth.

Referring now to the drawings in detail, the apparatus illustrated in FIG. 1 for cleaning low-lying layers of earth that contain noxious material has a drilling tube 1 that extends into the ground 2 that is to be subjected to a cleaning. The drilling tube 1 primarily comprises an inner tube 3 that is surrounded by an outer tube 4. The lower ends of the inner tube 3 and the outer tube 4 are sealed off relative to one another. The end face of the inner tube 3 that extends beyond the outer tube 4 is provided with a drill bit 5 that, under the interposition of a spacer 5a (FIG. 2), rests against the inner tube 3. Just above the drill bit 5, the inner tube 3 is provided with at least one lateral outlet nozzle 6.

By means of the annular space 8 that is formed between the inner tube 3 and the outer tube 4, a suction or extraction opening 7 that is disposed above the outlet nozzle 6 is connected to a suction pump 9 that in turn is connected to a non-illustrated processing unit.

By means of a mechanism that is not shown, the drilling tube 1 can be rotated and can be provided with an axial force, so that the drilling tube 1 can be driven axially into the ground. The displacement or dislodging of the earth is effected by the drill bit 5, which is provided with appropriate working surfaces.

By means of a high-pressure pump 10, cleaning fluid is conveyed into the interior of the inner tube 3, from where the cleaning fluid or medium, accompanied by a high drop in pressure, enters the respective layer of earth through the outlet nozzle 6 at a high speed. In so doing the cleaning medium, which is discharged in a highly concentrated manner, flows around the affected ground particles and thereby removes the noxious material that is found in the ground. Due to the very high pressure in the inner tube 3, the action of the discharging cleaning medium is similar to that of a cutting stream or jet, as a result of which in addition a loosening of the acted-upon layers of earth is effected. As a result of the movement of the drilling tube 1 in both an axial and a rotational manner, the cleaning medium that is discharged from the outlet nozzle 6 describes a cylindrical column of earth 11, which is indicated in FIG. 1 by a broken line. The diameter of the column of earth 11 depends upon the range of the cutting jet, which in turn is influenced by the nature of the ground.

At the same time as the discharge of the non-loaded cleaning medium via the outlet nozzle 6, there is effected via the effect of the suction pump 9, and via the suction opening 7, an extraction of the cleaning medium that is already loaded with washed-off noxious material. This is preferably effected in such a way that during the rotational introduction of the drilling tube 1 into the ground 2, the affected layers of earth are first soaked by the cutting jet that is discharge from the outlet nozzle 6 and, after the pertaining layers of earth pass into the effective range of the suction opening 7, the loaded cleaning medium is withdrawn by the action of the suction pump 9 and is conveyed to a subsequent processing unit. The distance between the suction opening 7 and the outlet nozzle 6 can be set by appropriate selection of the thickness of the spacer 5a.

Figure 2:
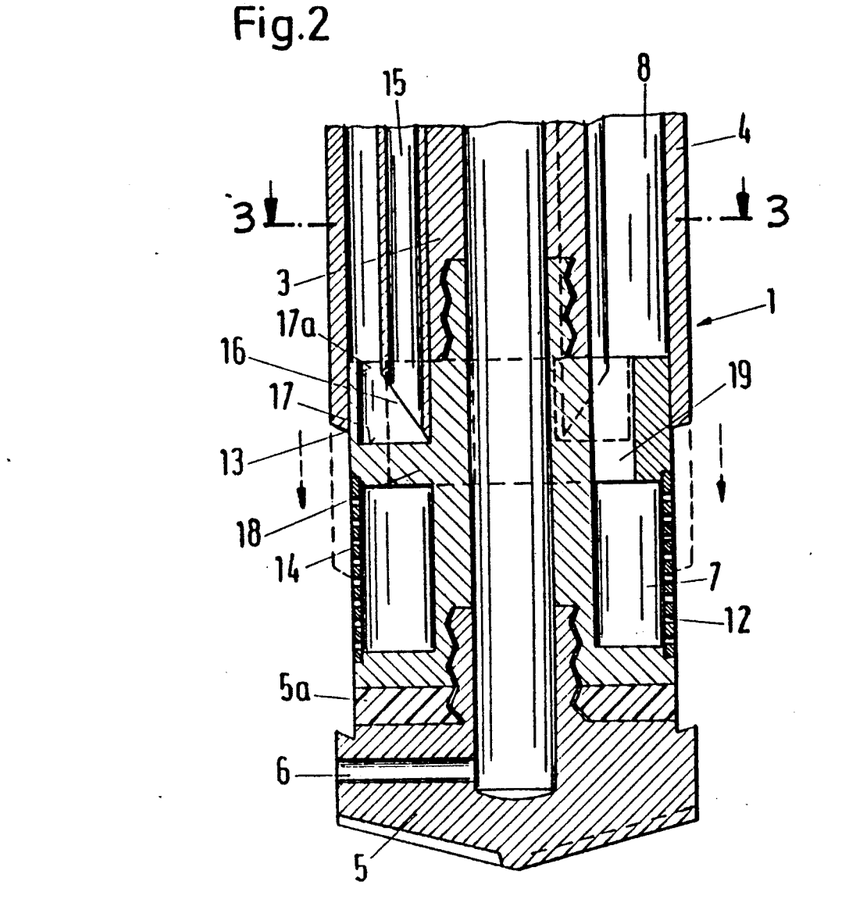
FIG. 2 is a longitudinal cross-sectional view through the lower portion of the apparatus of FIG. 1, and is taken along the line 2—2 in FIG. 3.

As can be seen from the detailed view of FIG. 2, the suction opening 7 is provided with a cylindrical screen 12 that extends about the inner tube 3 and prevents an extraction of particles of earth from the ground that surrounds the screen. In order to prevent the screen 12 from becoming clogged due to the deposition of particles of earth, an edge 13 is formed on the lower end face of the outer tube 4. As a consequence of a relative movement between the outer tube 4 and the inner tube 3, this edge 13 scrapes in a cleaning manner over the outer surface 14 of the screen 12, which in the illustrated embodiment is securely connected to the inner tube 3, thereby freeing the screen 12 of any undesired deposits.

Figure 3:
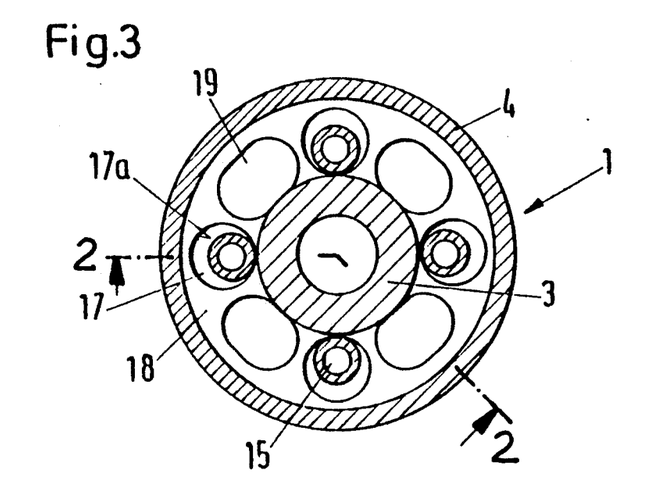
FIG. 3 is a cross-sectional view taken along the line 3—3 in FIG. 2.

As shown in FIGS. 2 and 3, disposed in the annular space 8 between the outer tube 4 and the inner tube 3 is at least one pressure line 15. The opening 16 of the pressure line 15 is disposed slightly above the suction opening 7, and is directed toward the base 17 of a blind hole 17a, so that compressed air that is supplied via the pressure line 15 is deflected or turned around and flows back to the upper end of the drilling tube 1 via the annular space 8. The blind hole 17a is disposed in the upper side of an annular flange 18 that is connected to the inner tube 3 and is axially interrupted by passages 19.

As can be seen in particular in FIG. 3, the blind holes 17a of the annular flange 18 are each in line with a pressure line 15, whereas the passages 19 are respectively disposed therebetween. In this way, gas, especially compressed air, that flows in under pressure via the pressure lines 15 is deflected at the base 17 by 180° and, accompanied by the generation of a partial vacuum adjacent to the passages 19, is guided back to the upper end of the drilling tube 1. Since the cross-sectional surface area of the free annular space 8 is greater than the overall cross-sectional surface area of the pressure lines 15, a partial pressure results in the region of the suction openings 7. This suction effect is utilized in order, where the suction pump 9 illustrated in FIG. 1 is eliminated or omitted, to generate the partial vacuum that is needed for extracting the cleaning medium that is loaded with noxious material. This last-mentioned possibility for conveying the cleaning medium back is primarily to be used where, due to the great suction height, a suction pump can no longer be utilized.

Figure 4:
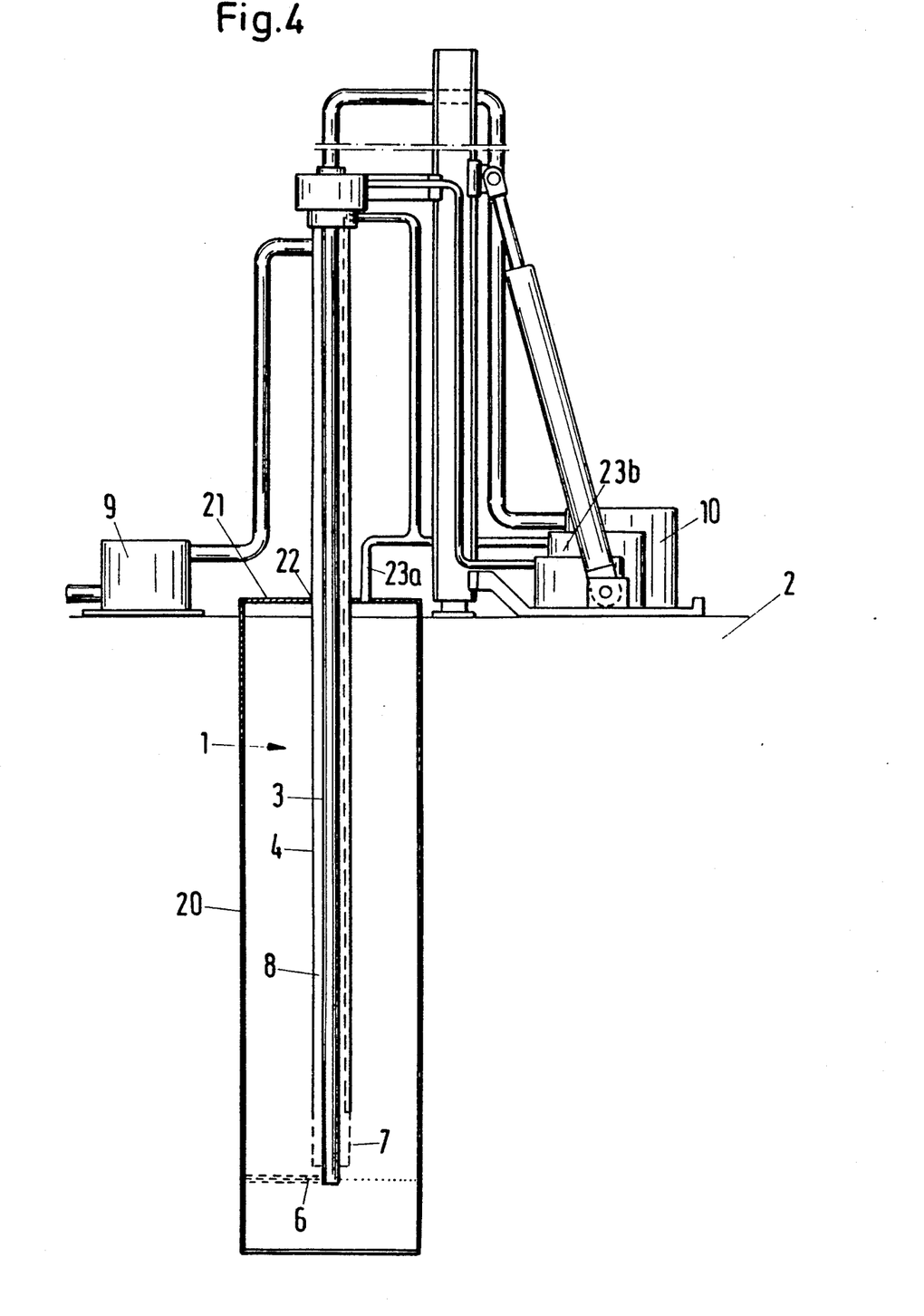
FIG. 4 is a view of one exemplary embodiment of the inventive apparatus that has been lowered into the ground for cleaning layers of earth within a lowered chamber.

As can be seen from the embodiment illustrated in FIG. 4, the drilling tube 1 is guided within a chamber 20 that is disposed in the ground 2 and is embodied as a cylindrical tube. The top of the chamber 20 is tightly closed off by a cover 21, with the drilling tube 1 being radially guided by a centrally disposed opening 22 in the cover 21. The chamber 20 is lowered into the ground 2 to such an extent that its lower edge is lower than the outlet nozzle 6 of the drilling tube 1 in its lowermost operating position.

In the embodiment illustrated in FIG. 4, the chamber 20 and the drilling tube 1 are axially displaceable relative to one another. Prior to introducing the drilling tube 1 into the ground 2, and hence prior to start of the actual cleaning process, the chamber 20 is introduced vertically into the ground 2, which can be realized, for example, with the aid of appropriate hydraulic apparatus. The previously described cleaning process subsequently begins with the introduction of the drilling tube 1.

The cover 21 of the chamber 20 is connected via a pressure connection 23a to a pressure pump 23b, preferably for the production of compressed air, so that at the surface of the ground that is surrounded by the chamber 20, a pressure cushion is produced to enhance the suction effect of the suction opening 7.

The inner diameter of the chamber 20 should be adapted to the strength of the cleaning medium, which is discharged from the outlet nozzle 6 in the form of a cutting jet. This must guarantee that the cutting jet reliably reaches the inner wall of the chamber 20, so that the entire layers of earth disposed within the chamber 20 are flushed. In addition, the magnitude of the suction effect via the suction opening 7 should be such that a reliable extraction of loaded cleaning medium is also assured from the regions close to the walls of the chamber 20.

Figure 5:
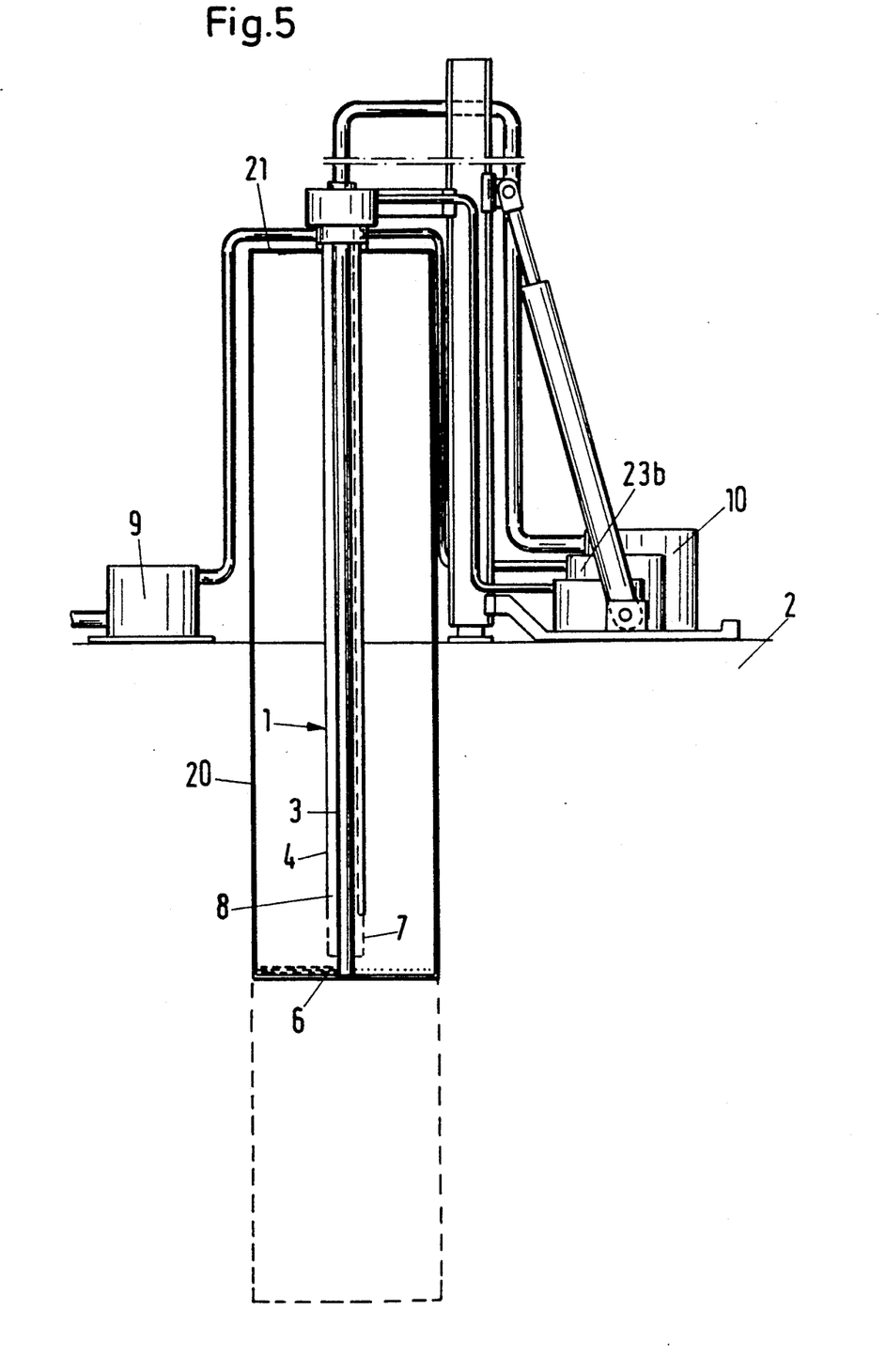
FIG. 5 shows another exemplary embodiment of an apparatus lowered into the ground for cleaning layers of earth within a chamber.

The embodiment of the present invention illustrated in FIG. 5 differs from the embodiment illustrated in FIG. 4 by the fact that the drilling tube 1 and the chamber 20 cannot be axially displaced relative to one another. In other words, the drilling tube 1 and the chamber 20 are simultaneously introduced into the ground 2. This can be effected either by simultaneous insertion of the two parts, or by driving in the chamber 20 while at the same time taking along the rotating drilling tube 1. The actual cleaning process can be carried out not only while lowering the chamber 20 and the drilling tube 1, but also during withdrawal thereof. An additional possibility is to rinse the ground 2 during the lowering process and to extract the cleaning medium that is loaded with noxious material during the subsequent raising or withdrawing process.

Figure 6A:
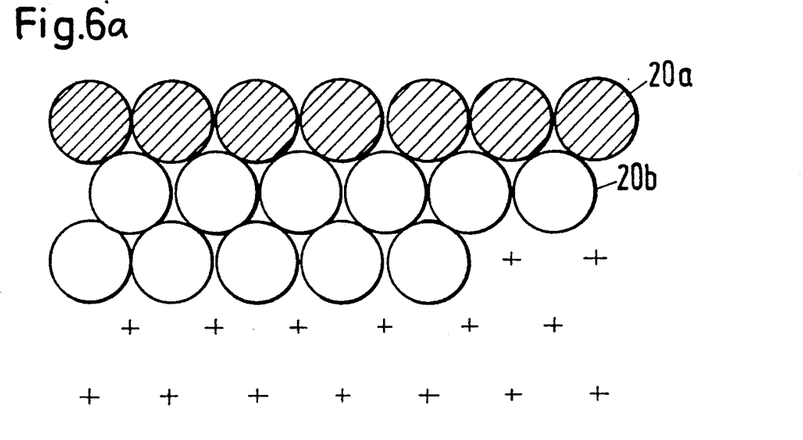
FIGS. 6a–6c are plan views showing three successive stages of the inventive method for cleaning layers of earth that contain noxious material.
Figure 6B:
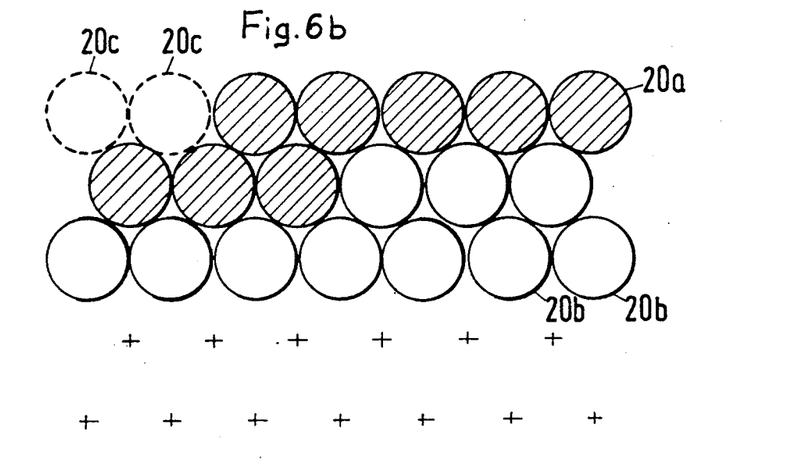
Figure 6C:
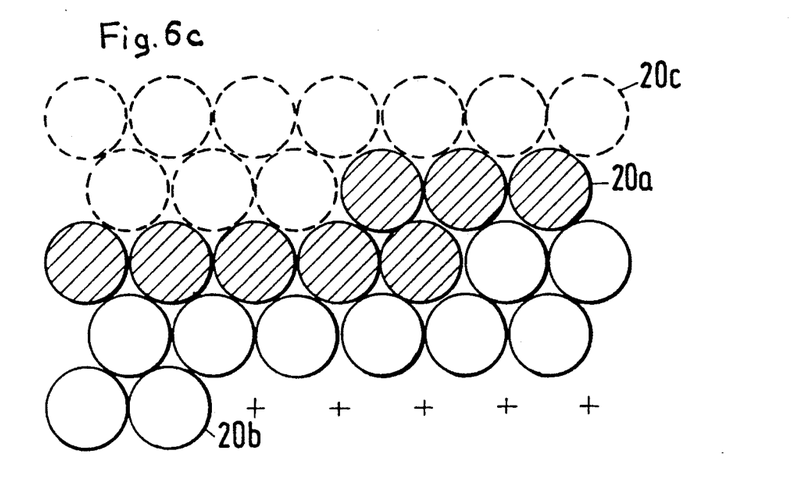

The inventive method for cleaning layers of earth that contain noxious material is advantageously carried out pursuant to the flow diagram that is illustrated in three stages in FIGS. 6a-6c. FIG. 6a shows how in the shaded row of chambers 20a, the cleaning process has already been concluded, while nearly two further rows of non-shaded chambers 20b have already been lowered into the ground without the cleaning process having begun. The central axes of chambers that are still to be inserted are indicated by small crosses.

FIG. 6b illustrates an already advanced process stage in which two chambers 20c have already been removed from the ground, and not-yet cleaned chambers 20b have been inserted into the incomplete rows. The cleaning process has already advanced to half way through the central row of chambers.

In the further process stage illustrated in FIG. 6c, already more than one complete row of chambers 20c have been removed from the ground, and have been inserted at the front as viewed in the direction of operation.

Figure 7:
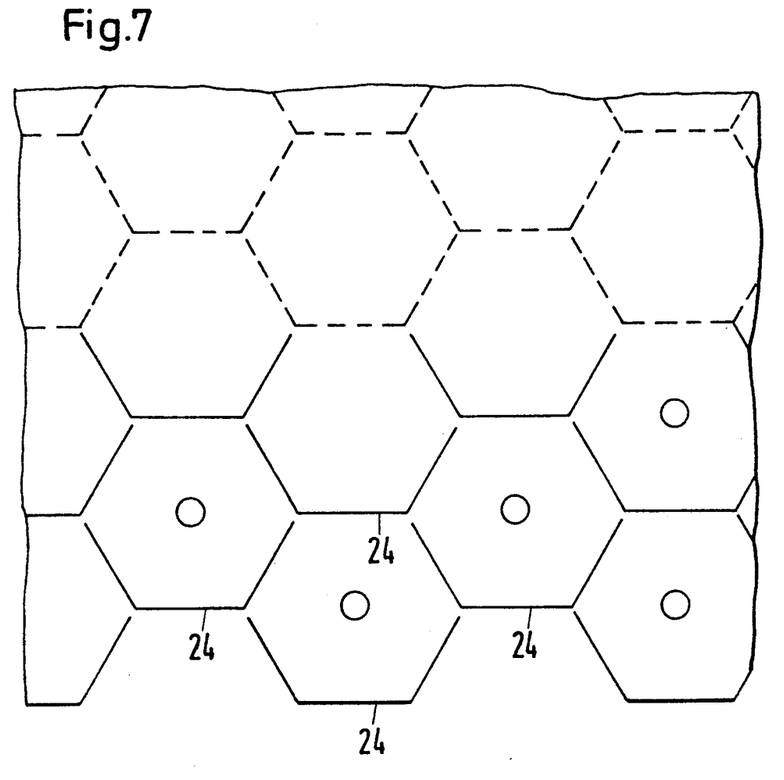
FIG. 7 is a plan view showing the inventive process for cleaning layers of earth that contain noxious material using a differently shaped chamber.

As can be seen from FIG. 7, it is not necessary for the chambers to be embodied as cylindrical tubes. Rather, the chambers could also have the shape of polygons that are composed of a plurality of forms 24 that have been vertically inserted into the ground. In the embodiment illustrated in FIG. 7, a chamber having the cross-sectional shape of a hexagon is respectively composed of four forms 24, with these forms having the shape of a trapezoid that is open along its long side.

Figure 8:
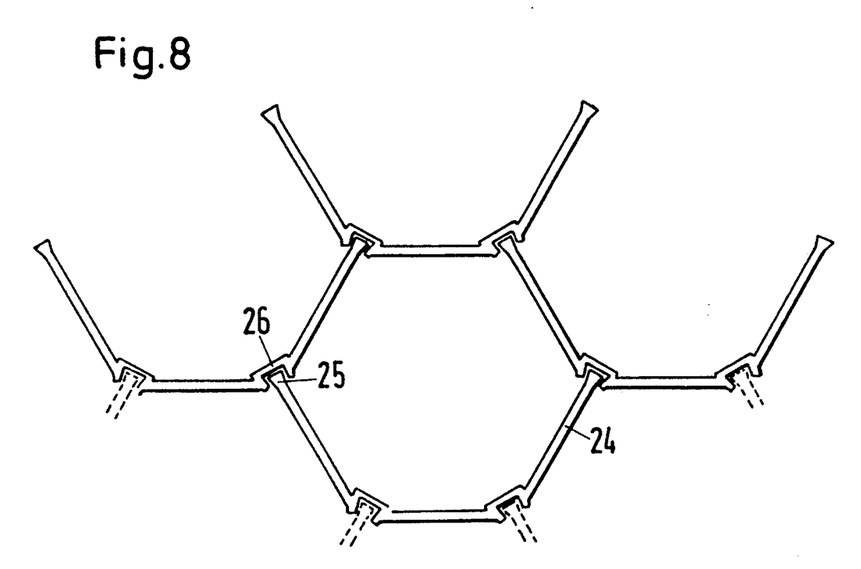
FIG. 8 is a detailed view of part of FIG. 7.

Finally, FIG. 8 illustrates that the trapezoidal forms 24 can be interconnected by coupling members 25, 26 that can be shifted in one another. In this manner, the forms 24 are guided during introduction into the ground that is to be cleaned, with an additional advantage being that an escape of cleaning medium that is loaded with noxious material into adjacent chambers is to a large extent prevented by the coupling members 25, 26. Of course, it is also possible to introduce the forms and coupling members into the ground simultaneously with the drilling tube 1. This can be effected while simultaneously carrying out the cleaning process.

Figure 9A:
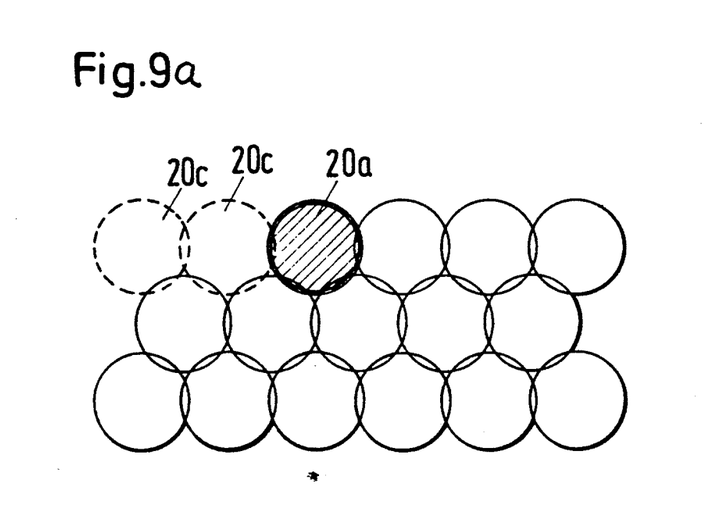
FIGS. 9a and 9b are plan views showing the inventive method for cleaning layers of earth that contain noxious material using one or more tubular chambers.
Figure 9B:
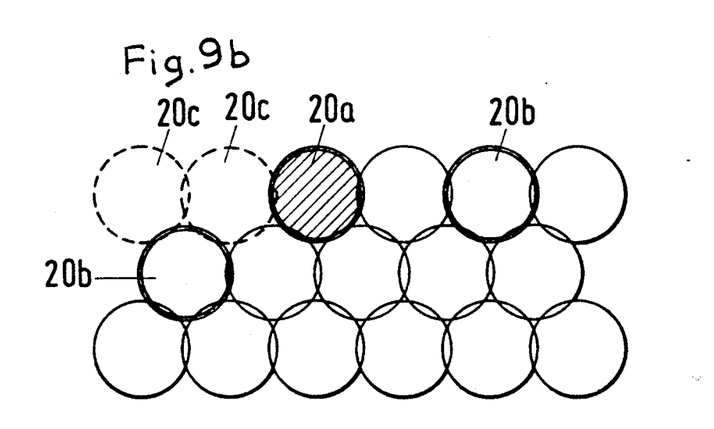

FIGS. 9a and 9b illustrate that the individual tubular chambers can also be disposed in such a way that the areas that are to be cleaned overlap one another. FIG. 9a shows that in the two dashed-line chambers 20c the cleaning process has already been concluded and the chamber 2 has been removed, whereas in the adjacent shaded chamber tube 20a, the cleaning process is underway. The areas where a chamber tube is still to be inserted are shown by a thin circular line, whereas the chamber that is to be cleaned is shown by a double circular line. The entire cleaning process is undertaken with only a single tubular chamber tube that is moved each time. FIG. 9b schematically illustrates that two or more chamber tubes can be used simultaneously, with the insertion locations being selected in such a way that the areas that are to be cleaned can overlap to a prescribed extent.

Figure 10:
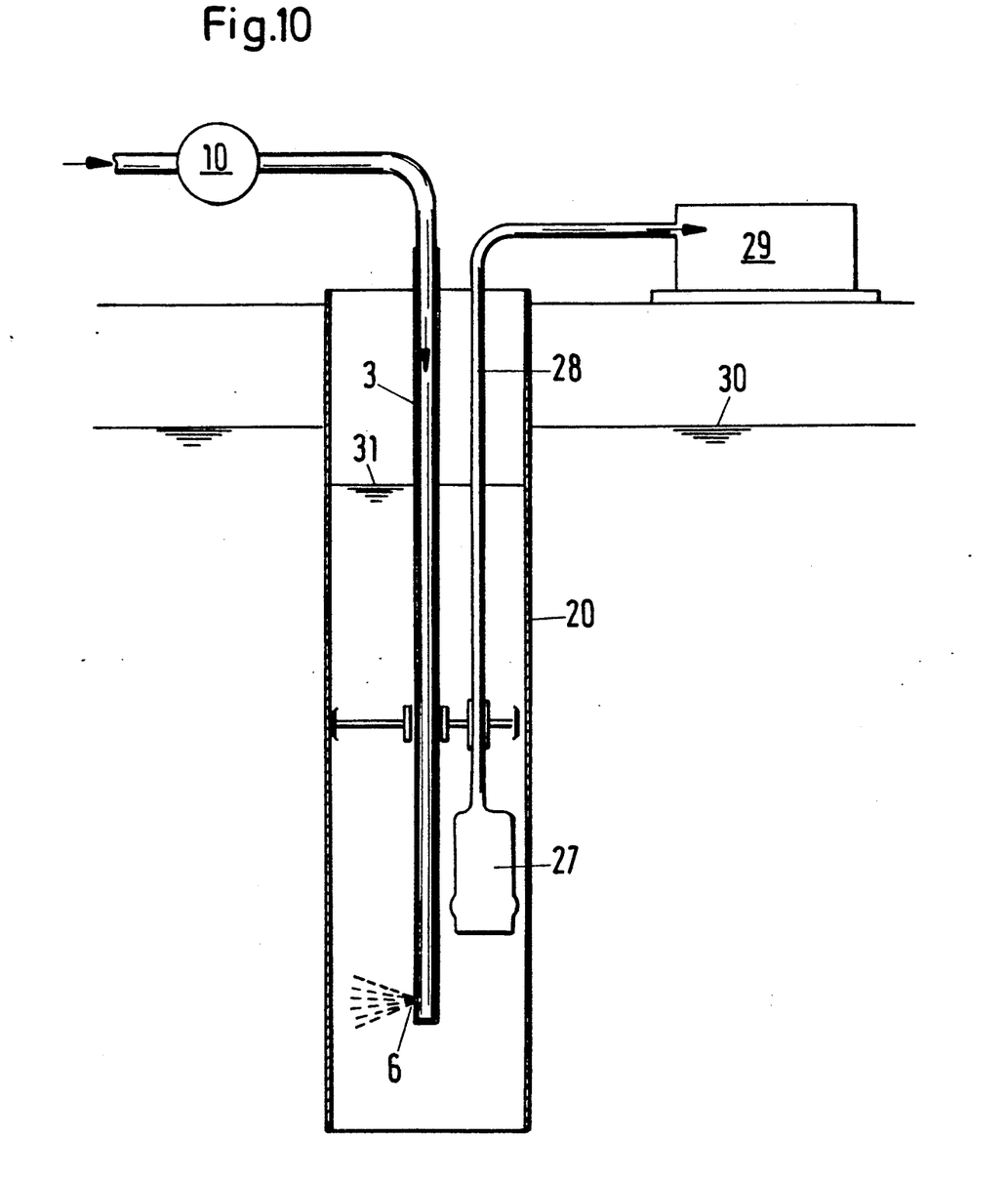
FIG. 10 shows an exemplary embodiment of the inventive apparatus lowered into the ground for cleaning layers of earth within a lowered chamber, and in addition shows a pump for solid matter.

FIG. 10 shows a further specific embodiment of the present invention. Disposed within the chamber 20, in addition to the inner tube 3 with the lower outlet nozzle 6, is a pump 27 for solid matter; the pump 27 is connected to a conveying line 28. The pump 27 can be controlled in such a way that the conveying capacity of the pump 27 conveys only that amount of sludge, which is a mixture of earth particles, noxious material, and cleaning medium, that the ground water level 31 present within the chamber 20 cannot drop below a prescribed low-level mark. The pump 27 conveys the sludge mixture via the conveying line 28 into the cleaning unit 29, which is disposed above ground. The reference numeral 30 denotes the ground water level outside the chamber 20.

The present invention is, of course, in no way restricted to the specific disclosure of the specification and drawings, but also encompasses any modifications within the scope of the appended claims.

We claim:

1. In a method of cleaning layers of earth that contain noxious material, including the steps of introducing cleaning medium into said earth layers under high pressure to effect separation of said noxious material on the spot from loosened earth particles, and the further step of removing said noxious material with said cleaning medium and returning same to the surface of the ground, the improvement comprising the steps of:
   a. providing a tubular chamber means that is downwardly open in a direction of introduction into the ground;
   b. introducing said tubular chamber means into the ground in a substantially vertical direction and defining a treatment zone therewith;
   c. carrying out a cleaning process in said tubular chamber means, with said cleaning process progressing in a vertical direction, and with said cleaning medium reaching an inner surface of said tubular chamber means and thus being applied to the entire soil enclosed in said tubular chamber means;
   d. removing said tubular chamber means from the ground;
   e. shifting the position of said tubular chamber means in a horizontal direction; and
   f. successively repeating steps be to advance a ground cleaning operation.

2. A method according to claim 1, which includes the steps, after termination of a respective cleaning process, of removing from the ground at least portions of said chambers utilized therefor, and shifting the same to a not-yet cleaned portion of the ground.

3. A method according to claim 2, which includes carrying out said shifting of said at least portions of said chambers in such a way that the same form a horizontally advancing honeycombed pattern.

4. A method according to claim 3, in which said shifting is carried out in such a way that cleaned and not-yet cleaned portions of the ground are separated from one another.

5. A method according to claim 1, which includes the steps of providing a drilling tube for conveying said cleaning medium, and simultaneously introducing said chambers and said drilling tube into said layers of earth.

6. A method according to claim 1, which includes the steps of introducing said chambers into the ground in a tubular manner, and disposing said chambers one after the other in such a way that regions of the ground that are to be cleaned overlap one another.

7. A method according to claim 6, which includes the steps of operating with only a single chamber tube and, after a cleaning process, shifting said chamber in a horizontal direction and reintroducing same into the ground.

8. A method according to claim 6, which includes the steps of simultaneously operating with at least two chamber tubes, and separately carrying out the steps of introduction of said chamber tubes, ground cleaning, and removal of said chamber tubes.

* * * * *

UNITED STATES PATENT AND TRADEMARK OFFICE
CERTIFICATE OF CORRECTION

PATENT NO. : 5,069,725
DATED : December 3, 1991
INVENTOR(S) : JOACHIM FISCHER ET AL It is certified that error appears in the above-identified patent and that said Letters Patent is hereby corrected as shown below:

ON THE TITLE PAGE, Inventors should read;

[75] Inventors: Joachim Fischer, Dormagen; Andreas Mönning, Düsseldorf, both of Fed. Rep. of Germany Signed and Sealed this Twelfth Day of January, 1993

Attest:

DOUGLAS B. COMER

*Attesting Officer*   Acting Commissioner of Patents and Trademarks